United States Patent Office 3,646,061
Patented Feb. 29, 1972

3,646,061
METHOD OF PREPARING N-ALKOXALYL AND N-FORMYL DERIVATIVES OF α-AMINO ACID ESTERS
Itsutoshi Maeda, Kanagawa-ken, Hideshi Miyayashiki, Tokyo, and Ryonosuke Yoshida, Kanagawa-ken, Japan, assignors to Ajinomoto Co., Inc., Tokyo, Japan
No Drawing. Filed May 29, 1969, Ser. No. 829,139
Claims priority, application Japan, June 10, 1968, 43/39,796; Aug. 10, 1968, 43/56,916
Int. Cl. C07d 27/60; C07c 101/00
U.S. Cl. 260—326.14 T        6 Claims

ABSTRACT OF THE DISCLOSURE

Alkyl esters of alkoxalylamino or N-formylamino acids are produced in high yields directly by heating the acids with oxalic acid or formic acid and a lower alkyl alcohol at 80–200° C.

---

This invention relates to a process for producing the alkyl esters of alkoxalylamino acids and of N-formylamino acids directly from amino acids. The products are intermediates for the synthesis of various nutrients and medicines, for example pyridoxine.

An alkyl ester of an alkoxalylamino acid heretofore, has been, heretofore, produced by reacting a hydrochloride of an amino acid ester with alkoxalylchloride (Chem. Ber., 30, 579–585 (1891)) or by reacting an amino acid ester with an excess of dialkyl oxalate. The former method is not practical, because the synthesis of alkoxalylchloride is troublesome. The latter method is also unsatisfactory, because it requires esterifying the oxalic acid, and it usually requires also preparing an ester from the free amino acid which preparation is troublesome.

Similarly, the known methods of producing an alkyl ester of an N-formylamino acid require at least two steps and a large amount of reagent. Of the known methods, one comprises converting an amino acid to an acid addition salt of its ester and formylating the product (German Pat. No. 1,201,357; J. Am. Chem. Soc., 71, 645 (1949)), and other one comprises formylating an amino acid with formic acid and acetic anhydride, and esterifying the product (Z. Naturforsch, 17b, 785 (1962)).

The present invention produces an alkyl ester of an alkoxalylamino or N-formylamino acid directly from the amino acid by the single step of heating an amino acid selected from the group consisting of glycine, alanine, α-amino butyric acid, valine, leucine, isoleucine, phenylalanine, tyrosine, tryptophan, cystine, methionine, lysine and ornithine, with oxalic acid or formic acid in a lower alkanol;

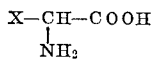

(wherein X is a radical which constitutes said amino acid) and a carboxylic acid having the general formula;

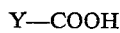

(wherein Y is H or COOH) in an alcohol having general formula; having one to four carbon atoms at 80–200° C. until a compound including a radical of the formula

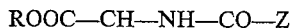

is formed; R being lower alkyl having up to 4 carbon atoms, and Z being hydrogen or COOR.

When a diamino-monocarboxylic acid is used, an alkyl N,N'-diformyl- or N,N'-dialkoxalyl-diaminocarboxylate may be formed, and it is recommended to use a diamino-monocarboxylic acid monohydrochloride, when an alkyl N-monoformyl- or N-monoalkoxalyl-diaminocarboxylate is desired.

Since the alcohol such as methanol, ethanol, propanol, iso-propanol and n-butanol, acts as a reagent as well as a solvent, the alcohol is used in an excess amount, usually 10–50 moles per mole of amino acid.

Formic acid or oxalic acid is usually employed in an amount of 1–5 moles, preferably 2–3 moles per mole of amino acid.

The reaction proceeds easily when the mixture of amino acid, alcohol and formic or oxalic acid is heated at a temperature within the range of 80 to 200° C.

When formic acid is used, the product is a formylamino-acid ester, however, when oxalic acid is used esters of the N-formylamino acid are also formed. At a ratio of which depends mainly on the reaction temperature.

In general, the yield of alkoxalylamino acid ester decreases and that of N-formylamino acid ester increases with increasing reaction temperature, when the reaction is carried out above 160° C. Therefore, alkoxalylamino acid esters are preferably produced at a temperature below 160° C. particularly 110–150° C. The yield of N-formylamino acid ester is not affected by the presence of water, but the yield of alkoxalylamino acid ester increases when the moisture is excluded from the reaction mixture, and anhydrous oxalic acid is a better reagent than oxalic acid dihydrate.

Water is formed in the reaction mixture and should be removed with an alcohol in the course of the reaction, and by adding an alcohol to the residue, followed by heating.

When N-formylamino acid esters are produced, the removal of water is unnecessary and a temperature higher than 150° C., particularly 160–200° C., is preferable.

After the reaction unreacted alcohol and alkyl formate or dialkyl oxalate formed by side reaction are recovered by distillation, and the desired product is isolated by distillation or crystallization.

According to the invention, the esterification and the formylation or alkoxalylation of an amino acid are performed in a single step, and the starting materials are only an amino acid, an alcohol and formic or oxalic acid.

EXAMPLE 1

A mixture of 26.7 g. of alanine, 82.8 g. of anhydrous oxalic acid and 240 g. of ethanol was kept at 120° C. for 8 hours. After distilling off ethanol and diethyl oxalate, the residue was fractionally distilled under reduced pressure to obtain 36.1 g. of ethyl ethoxalylalaninate having a boiling point of 145–150° C./4 mm. Hg and 8.1 g. of ethyl N-formylalaninate of B.P. 120–122° C./7 mm. Hg.

EXAMPLE 2

After a mixture of 13.4 g. of alanine, 41.4 g. of anhydrous oxalic acid and 95 g. of methanol was kept at 120° C. for 4 hours, methanol and water were distilled off. To the residue 95 g. of methanol were added and the mixture was further heated to 120° C. for 4 hours. The reaction mixture was further dehydrated by replacing the methanol, and the reaction was repeated once more in the same conditions as above. The reaction mixture was fractionally distilled to obtain 20.2 g. of methyl methoxalylalaninate as a fraction boiling at 137–140° C./5 mm. Hg.

EXAMPLE 3

A mixture of 4.45 g. of alanine, 13.5 g. of anhydrous oxalic acid and 44 g. of ethanol was heated under the conditions listed in the following table. The yield of ethyl ethoxalylalaninate is shown in said table.

For instance, the experiment of run No. 2 was made by heating the mixture at 120° C. for 4.5 hours, distilling off ethanol and water, adding 44 g. of ethanol to the residue and heating the mixture at 120° C. for 5 hours.

| No. | Reaction conditions—reaction temperature,° C. (time, hours) | Yield, percent |
| --- | --- | --- |
| 1 | 120 (6) | 51.0 |
| 2 | 120 (4.5) plus 120 (5) | 76.3 |
| 3 | 120 (3) plus 150 (3) | 81.1 |
| 4 | 130 (3) plus 130 (3) plus 130 (3) | 79.1 |

EXAMPLE 4

A mixture of 17.8 g. of alanine, 53.5 g. of anhydrous oxalic acid and 184 g. of ethanol was kept at 180° C. for 5 hours. Ethanol was distilled off and the residue was fractionally distilled under reduced pressure to obtain 14.5 g. of ethyl N-formylalaninate of B.P. 99–103° C./2 mm. Hg and 4.1 g. of ethyl ethoxalylalaninate of B.P. 145–149° C./4 mm. Hg.

EXAMPLE 5

A mixture of 11.27 g. of glycine, 40.5 g. of anhydrous oxalic acid and 138 g. of ethanol was kept at 120° C. for 3 hours. After ethanol and water were distilled off, 138 g. of ethanol were added to the residue and the reaction was continued at 120° C. for 3 hours. Then, the dehydration of the reaction mixture was repeated by replacing methanol and the reaction was also repeated in the same conditions as above. The reaction mixture was fractionally distilled to obtain 24.6 g. of ethyl ethoxalylglycinate having a boiling point of 135–138° C./5 mm. Hg and 0.7 g. of ethyl N-formylglycinate having a boiling point of 135–140° C./7 mm. Hg.

EXAMPLE 6

A mixture of the same composition as that used in Example 5 was kept at 180° C. for 3 hours and distilled to obtain 6.3 g. of ethyl N-formylglycinate and 9.0 g. of ethyl ethoxalylglycinate.

EXAMPLE 7

The process of Example 5 was repeated, but 19.7 g. of leucine were used in place of the glycine, and 30.5 g. of ethyl ethoxalylleucine having a boiling point of 150–154° C./4 mm. Hg and 1.6 g. of ethyl N-formylleucine having a boiling of 143–148° C./8 mm.Hg were obtained.

EXAMPLE 8

A mixture of 19.7 g. of leucine, 40.5 g. of anhydrous oxalic acid and 138 g. of ethanol was kept at 180° C. for 5 hours and distilled to obtain 10.5 g. of ethyl N-formylleucinate and 9.4 g. of ethyl ethoxalylleucinate.

EXAMPLE 9

The process of Example 8 was repeated, but 24.8 g. of phenylalanine were used in place of the leucine, and 9.5 g. of ethyl N-formylphenylalaninate having a boiling point of 155–160° C./1 mm. Hg and 5.7 g. of ethyl ethoxalylphenylalaninate having a boiling point of 180–185° C./1 mm. Hg were obtained.

EXAMPLE 10

A mixture of 15.0 g. of glycine, 27.6 g. of formic acid and 128 g. of methanol was kept at 160° C. for 5 hours. On fractionally distilling the reaction mixture under reduced pressure, 14.7 g. of methyl N-formylglycinate having a boiling point of 137–138° C./8 mm. Hg were obtained.

EXAMPLE 11

A mixture of 19.7 g. of leucine, 20.7 g. of formic acid and 138 g. of ethanol was kept at 170° C. for 5 hours. After ethanol was removed, crystals formed and were removed by filtration and the residue was fractionally distilled under reduced pressure to obtain 15.8 g. of ethyl N-formylleucinate having a boiling point of 138–139° C./5 mm. Hg.

EXAMPLE 12

A mixture of 24.8 g. of phenylalanine, 20.7 g. of formic acid and 138 g. of ethanol was kept at 170° C. for 3 hours and 17.5 g. of ethyl N-formylphenylalaninate having a boiling point of 158–159° C./1 mm. Hg were obtained by fractionally distilling the reaction mixture under reduced pressure.

EXAMPLE 13

A mixture of 8.9 g. of alanine, 13.8 g. of formic acid and 148 g. of butanol was kept at 170° C. for 5 hours and the reaction mixture was fractionally distilled under reduced pressure to obtain 8.7 g. of butyl N-formylalaninate having a boiling point of 131–133° C./3 mm. Hg.

EXAMPLE 14

A mixture of 9.1 g. of lysine monohydrochloride, 7.1 g. of formic acid and 32 g. of methanol was kept at 160° C. for 5 hours. On distilling off methanol and other volatile components, 7.7 g. sirupy methyl N-formyllysinate monohydrochloride were obtained. The structure of the product was confirmed by infrared absorption spectra.

EXAMPLE 15

A mixture of 22.4 g. of methionine, 20.7 g. of formic acid and 96 g. of methanol was kept at 160° C. for 5 hours. After distilling off methanol, the residue was fractionally distilled to obtain 13.6 g. of methyl N-formylmethionate having a boiling point of 160–167° C./2 mm. Hg.

EXAMPLE 16

A mixture of 11.3 g. of glycine, 20.7 g. of formic acid and 138 g. of ethanol was kept at 170° C. for 5 hours. After ethanol was distilled off, the mixture was fractionally distilled under reduced pressure to obtain 11.0 g. of ethyl N-formylglycinate having a boiling point of 125–130° C./6 mm. Hg.

What we claim is:

1. A method of preparing an alkyl ester of an N-alkoxalyl or N-formyl derivative of an amino acid selected from the group consisting of glycine, alanine, α-aminobutyric acid, valine, leucine, isoleucine, phenylalanine, tyrosine, tryptophan, crystine,, methionine, lysine, and ornithine, said ester including the group ROOC—CH—NH—CO—Z, which comprises:
   (a) mixing said amino acid, an alkanol of the formula R—OH, and a carboxylic acid selected from the group consisting of oxalic acid and formic acid; and
   (b) holding the resulting mixture at 80° to 200° C. until said alkyl ester is formed,
      (1) in said formulas, R being alkyl having up to four carbon atoms, and Z being hydrogen or COOR,
      (2) said alkanol being present in said mixture in an amount in excess over that required for supplying said R in said alkyl ester.

2. A method as set forth in claim 1, wherein the amount of said carboxylic acid in said mixture is 1 to 5 moles per mole of said amino acid, and the amount of said alkanol is between 10 and 50 moles per mole of said amino acid.

3. A method as set forth in claim 1, wherein said carboxylic acid is formic acid and said mixture is kept at 150° to 200° C.

4. A method as set forth in claim 1, wherein said carboxylic acid is oxalic acid, and said mixture is kept at 110° to 150° C.

5. A method as set forth in claim 1, wherein said amino acid is a diamino-monocarboxylic acid and present in said mixture as the monohydrochloride.

6. A method as set forth in claim 1, which further comprises recovering said alkyl ester.

References Cited

UNITED STATES PATENTS 2,451,310   10/1948   Albertson et al. __ 260—326.14

OTHER REFERENCES

Jones, L. Am. Chem. Soc. 71-645 (1949).

ALEX MAZEL, Primary Examiner

J. A. NARCAVAGE, Assistant Examiner

U.S. Cl. X.R.

260—471 A, 481 R, 482 R, 482 P, 518 R, 534 R